United States Patent
Calmon

(10) Patent No.: US 12,520,858 B2
(45) Date of Patent: Jan. 13, 2026

(54) METHOD FOR PREPARING LOW-LIPID PEA PROTEIN ISOLATE

(71) Applicant: ROQUETTE FRERES, Lestrem (FR)

(72) Inventor: Lucile Calmon, Lille (FR)

(73) Assignee: Roquette Freres, Lestrem (FR)

( * ) Notice: Subject to any disclaimer, the term of this patent is extended or adjusted under 35 U.S.C. 154(b) by 574 days.

(21) Appl. No.: 17/757,806

(22) PCT Filed: Dec. 22, 2020

(86) PCT No.: PCT/FR2020/052598
§ 371 (c)(1),
(2) Date: Jun. 21, 2022

(87) PCT Pub. No.: WO2021/130446
PCT Pub. Date: Jul. 1, 2021

(65) Prior Publication Data
US 2023/0037936 A1    Feb. 9, 2023

(30) Foreign Application Priority Data
Dec. 23, 2019  (FR) ...................................... 1915459

(51) Int. Cl.
*A23J 1/14*    (2006.01)
*A23K 20/147*  (2016.01)
*A23L 33/185*  (2016.01)

(52) U.S. Cl.
CPC ............. *A23J 1/148* (2013.01); *A23K 20/147* (2016.05); *A23L 33/185* (2016.08); *A23V 2002/00* (2013.01)

(58) Field of Classification Search
None
See application file for complete search history.

(56) References Cited

U.S. PATENT DOCUMENTS

2011/0045128 A1   2/2011   Damodaran et al.

FOREIGN PATENT DOCUMENTS

| | | |
|---|---|---|
| EP | 1400537 A1 | 3/2004 |
| FR | 2889417 A1 | 2/2007 |
| FR | 3071132 A1 | 3/2019 |
| WO | 2015/071498 A1 | 5/2015 |
| WO | 2017/120597 A1 | 7/2017 |

OTHER PUBLICATIONS

Third Party Observations in the corresponding EP application No. 20851290.5, notified by the EPO on Jun. 29, 2022. (Machine translation.).
Product sheet, "Isolated Pea Protein," Pevesa biotech, published on Oct. 2, 2018.
Product sheet, "PISANETM C9," Cosucra Groupe Warcoing S.A., published in Mar. 2019.
Technical sheet, "VITESSENCETM Pulse 1803," pea protein, INGREDION, published on Nov. 26, 2019.
Product data sheet, "Pea Protein YS 85%," The Scoular Company, published in Sep. 2013.
Zhu Dan, et al., "Removal of off-flavour-causing precursors in soy protein by concurrent treatment with phospholipase A2and cyclodextrins", Food Chemistry, Elsevier Ltd, NL, vol. 264, May 9, 2018 (May 9, 2018), pp. 319-325 DOI: 10.1016/J.FOODCHEM. 2018.05.045ISSN: 0308-8146, XP085402647; paragraph [0001] paragraph [02.3] paragraph [03.1]-paragraph [03.4].
Ak Shay Arora, et al., "Removal of soy protein-bound phospholipids by a combination of sonication.-cyclodextrin. and phospholipase Atreatments", Food Chemistry, Elsevier Ltd, NL, vol. 127, No. 3, Jan. 19, 2011 (Jan. 19, 2011), pp. 1007-1013, [retrieved on Jan. 26, 2011] DOI: 10.1016/J.FOODCHEM.2011.01.073 ISSN: 0308-8146, XP028176529; paragraph [0001] paragraph [02.2] paragraph [03.2].

*Primary Examiner* — Lien T Tran

(57) ABSTRACT

The present invention relates to leguminous protein isolates, particularly pea protein isolates having a low lipid content, as well as to the method for the preparation thereof. In one embodiment, provided is a leguminous plant protein isolate from pea and faba bean wherein said isolate does not contain organic solvent.

13 Claims, No Drawings

METHOD FOR PREPARING LOW-LIPID PEA PROTEIN ISOLATE

TECHNICAL FIELD

The invention relates to the field of plant proteins, in particular of leguminous protein isolates, even more particularly of pea protein isolates having a low lipid content.

BACKGROUND ART

Human daily requirements for proteins are between 12 and 20% of food intake. These proteins are supplied both by products of animal origin (meat, fish, eggs, dairy products) and by products of plant origin (cereals, leguminous plants, algae).

However, in developed countries, protein intake is predominantly in the form of proteins of animal origin. And yet, numerous studies show that excessive consumption of proteins of animal origin to the detriment of plant proteins is one of the causes of increases in cancer and cardiovascular diseases.

Moreover, animal proteins have many disadvantages, both in terms of their allergenicity, regarding in particular proteins originating from milk or eggs, and in terms of the environment, in relation to the harm done by intensive farming.

Thus, there is an increasing demand from manufacturers for compounds of plant origin having beneficial nutritional and functional properties without, however, having the disadvantages of compounds of animal origin.

Nevertheless, replacing animal proteins by vegetable proteins is not always easy because their physical and chemical properties are different, and this has an impact on the sensory qualities of the foods in which these proteins are incorporated.

Since the 1970s, the development of pulse plants, in particular including pea, in Europe and mainly in France, has dramatically increased as an alternative protein resource to animal proteins for animal and human food consumption. The pea contains approximately 27% by weight of protein substances. The term "pea" is considered here in its broadest accepted use and includes, in particular, all the wild varieties of "smooth pea" and all the mutant varieties of "smooth pea" and "wrinkled pea", regardless of the uses for which said varieties are usually intended (human food, animal feed and/or other uses). These seeds are non-GMOs unlike soy, and do not require a de-oiling step using solvents.

A disadvantage of some plant proteins, especially leguminous plant proteins, and more particularly pea proteins, is that they are not taste-free. They can therefore bring off-flavors to the foods in which they are incorporated. These tastes are frequently described by consumers as "beany", pea-like or bitter.

A known solution to this problem is to mask these unpleasant flavors by introducing chemical compounds such as flavors during the manufacturing process. Nevertheless, this solution is often not satisfactory because it does not allow to mask the unpleasant flavor but only to reduce it slightly. A second disadvantage is that the food manufacturing process is then more expensive due to the addition of extra ingredients. In addition, more and more consumers are turning away from products containing chemical compounds in favor of healthier food.

A more advantageous solution is to use directly a vegetable protein isolate with little or no unpleasant taste. Some examples of methods to obtain such isolates are already described. For example, WO2015/071498 describes a wet milling extraction method, combined with lactic acid fermentation, to extract a purified pea protein isolate. Another example in WO2017/120597 describes a method for precipitation in the form of salts, combined with a specific washing of the proteins with a large volume of an aqueous solution at neutral pH. Nevertheless, these methods are not satisfactory because they result in protein isolates that still have a pea-like taste and bitterness.

As lipids are the substrates of lipoxygenase and oxidation reactions leading to the formation of volatile compounds responsible for off-flavors in leguminous plant protein, lipid extraction could be an efficient method to produce protein isolates devoid of these off-flavors and/or with a more stable flavor during storage, in particular due to the oxidation of residual lipids. Indeed, it is described in the literature (Sessa and Rackis J. A. Oll Chemists' Soc 1979, 56, 262-271) that the main cause of the development of these off-flavors during harvesting, processing, and storage is the oxidation of unsaturated fatty acids, particularly linoleic and linolenic acids.

Among the routes studied for extraction is the use of cyclodextrins, which are cyclic oligosaccharides composed of several glucopyranose units (C6H10O5) linked by an α-(1,4) bond. The most common are α-cyclodextrins, β-cyclodextrins and γ-cyclodextrins consisting of 6, 7 and 8 glucopyranoses respectively. In the literature, the use of β-cyclodextrin has been experimented to remove residual lipids and phospholipids from soybean protein isolates derived from delipidated meal. As lipids are the substrates of lipoxygenase and oxidation reactions leading to the formation of volatile compounds responsible for off-flavors in legumes, lipid extraction by β-cyclodextrin could be an efficient method to produce protein isolates devoid of these off-flavors. In this area, reference can be made to Zhu et al, Food Chemistry, 264 (2018), which advocates the use of an α-cyclodextrin, as well as Akshay Arora et al, Food Chemistry, 127, no. 3, 2011 and US20110045128 A1, which advocate the use of an ultrasonic treatment combined with the use of cyclodextrin.

It is therefore advantageous to obtain a leguminous plant protein, in particular a leguminous plant protein isolate, even more particularly a pea protein isolate with a low lipid content.

GENERAL DESCRIPTION OF THE INVENTION

According to a first aspect of the invention, a leguminous plant protein isolate is proposed, the legume being chosen in particular from peas and faba beans, preferentially peas, characterized in that it contains between 7 g and 9 g, preferentially between 7.5 g and 8.5 g, of total lipids per 100 g of proteins.

According to another aspect, a method for preparing a protein isolate according to the invention is proposed, characterized in that it comprises the following steps:

1) suspending leguminous plant proteins, preferentially chosen between pea and faba bean, preferentially pea, in water;
2) adjusting the pH to 8.5;
3) heating to a temperature between 40 and 50° C., preferentially 45° C.;
4) adding an aqueous solution comprising a mixture of phospholipases and β-cyclodextrins characterized in that the ratio between the phospholipase A2 activity and the amount of β-cyclodextrins, expressed in units of PLA2 activity per g of β-cyclodextrins, is between 10 and 100, preferentially between 20 and 80, even more preferentially between 25 and 50;

5) stirring fora time between 160 and 200 min, preferentially 180 minutes;

6) adjusting the pH to 4.5;

7) heating to a temperature between 50 and 70° C., preferentially 60° C. for 8 to 12 minutes, preferentially 10 minutes;

8) centrifugating then optionally washing in demineralized water, then centrifugating a second time;

9) suspending the protein pellet in water, then adjusting the pH to 7;

10) drying the obtained protein isolate.

According to a last aspect of the invention, the industrial uses, in particular the animal feed and human food uses, of the leguminous plant protein isolate, chosen from pea, lupin and faba bean, even more preferentially of the pea protein isolate according to the invention, are proposed.

The invention will be better understood by means of the detailed description hereinbelow.

DETAILED DESCRIPTION OF THE INVENTION

According to a first aspect of the invention, a leguminous plant protein isolate is therefore proposed, the legume being chosen in particular from peas and broad beans, preferentially peas, characterized in that it contains between 7 g and 9 g, preferably between 7.5 g and 8.5 g, of total lipids per 100 g of proteins. Preferentially, the leguminous plant protein composition is a pea protein isolate.

The term "protein isolate" is to be understood in the present application as a composition having a protein content of more than 70%, preferentially more than 80%, even more preferentially more than 85%, this percentage being understood as relative to the dry matter of said composition. The protein content will be calculated by any technique that is well known to the person skilled in the art. In particular, the total Kjeldahl nitrogen is assayed, and the result is multiplied by the coefficient 6.25. Said composition therefore comprises proteins, macromolecules formed from one or more polypeptide chains consisting of a sequence of amino acid residues bonded to one another by peptide bonds. In the particular context of pea proteins, the present invention relates more particularly to globulins (about 50-60% of the pea proteins). Pea globulins are mainly subdivided into three sub-families: legumins, vicilins and convicilins.

"Leguminous plant" or "legume" will be understood in the present application to mean the family of dicotyledonous plants of the Fabales order. This is one of the largest flowering plant families, third after Orchidaceae and Asteraceae in terms of number of species. It contains approximately 765 genera, bringing together more than 19,500 species. Several leguminous plants are significant crop plants, such as soybean, beans, peas, chickpea, faba bean, groundnut, cultivated lentil, cultivated alfalfa, various clovers, broad beans, locust bean, licorice and lupin.

The term "peas" in the present application includes pea varieties belonging to the *Pisum* genus and more particularly to the species *sativum* and *aestivum*. Said mutant varieties are in particular those named "mutants r", "mutants rb", "mutants rug 3", "mutants rug 4", "mutants rug 5" and "mutants lam" as described in the article by C-L HEYDLEY et al., entitled "Developing novel pea starches," Proceedings of the Symposium of the Industrial Biochemistry and Biotechnology Group of the Biochemical Society, 1996, pp. 77-87.

The term "total lipids" in the present application is defined as all lipid molecules without distinction. They include triglycerides, phospholipids and free fatty acids. The determination of the lipids is carried out by acid hydrolysis, followed by an extraction with hexane and a specific determination of the lipids thus extracted, preferentially by gas chromatography. The preferred method is described below.

Preferentially, the leguminous plant of the protein isolate is pea.

Preferentially, the protein isolate according to the invention is characterized in that its linoleic acid content is reduced by 20% to 30%, preferentially 25%, compared to the content present in the leguminous plant seed.

By "linoleic acid" is meant according to the invention the omega-6 polyunsaturated fatty acid corresponding to all-cis-$\Delta$9,12 C18:2 n-6 acid. Its structural formula is: $H_3C-(CH_2)_4-CH=CH-CH_2-CH=CH-(CH_2)_7-COOH$.

As described for example in (Sessa and Rackis 1977) "The main cause of the development of off-flavors during harvesting, manufacturing and storage is the oxidation of polyunsaturated fatty acids (e.g. linoleic and linolenic acids)." As will be shown in the examples below, it is remarkable to see that thanks to the invention, the content of these acids is considerably reduced.

The protein isolate may have the advantage of not containing traces of organic solvent, that is containing less than 100 ppm of solvent based on the dry mass of isolate. Preferentially, the isolate contains less than 10 ppm based on the dry weight of the isolate, preferentially none at all. By organic solvent, we mean a solvent made of molecules comprising at least one carbon atom. Instead, the isolate may include inorganic solvents, typically water. This is an advantage over isolates made by a method that comprises a lipid extraction step with an organic solvent such as hexane.

The protein isolate of the invention may have good functional properties, by good oil or water retention.

According to another aspect, a method for producing a leguminous plant protein composition according to the invention is proposed, characterized in that it comprises the following steps:

1) suspending leguminous plant proteins, preferentially chosen between pea and faba bean, preferentially pea, in water;

2) adjusting the pH to 8.5;

3) heating to a temperature between 40 and 50° C., preferentially 45° C.;

4) adding an aqueous solution comprising a mixture of phospholipases and β-cyclodextrins, characterized in that the ratio between the phospholipase A2 activity and the amount of β-cyclodextrins, expressed in units of PLA2 activity per g of β-cyclodextrins, is between 10 and 100, preferentially between 20 and 80, even more preferentially between 25 and 50;

5) stirring for a time between 160 and 200 min, preferentially 180 minutes;

6) adjusting the pH to 4.5;

7) heating to a temperature between 50 and 70° C., preferentially 60° C. for 8 to 12 minutes, preferentially 10 minutes;

8) centrifugating then optionally washing in demineralized water, then centrifugating a second time;

9) suspending the protein pellet in water, then adjusting the pH to 7;

10) drying the obtained protein isolate.

Preferentially, step 1 is carried out by suspending leguminous plant proteins characterized in that they are composed of more than 50% globulins, preferentially more than 70%, even more preferentially more than 80%. Such globulins can be easily obtained by grinding the seed into meal, suspending it in water and separating the fibers & starch using hydrocyclones and centrifuges. The protein-enriched supernatant solution will then be rectified to isoelectric pH (approximately 4.5) and undergo controlled heating to separate the globulins into a flocculent coagulate. Such a method is described in the present applicant's patent EP1400537.

In steps 1 and 8, "water" means any type of water suitable for protein extraction for food consumption. Preferably, decarbonated, demineralized or drinking water will be used.

Concerning step 4, the ratio between the phospholipase A2 activity and the amount of β-cyclodextrins, expressed in units of PLA2 activity per g of β-cyclodextrins, is between 10 and 100, preferentially between 20 and 80, even more preferentially between 25 and 50.

Preferably, the amount of β-cyclodextrins is calculated in relation to the amount of total lipids in the protein isolate. This amount varies between 0.04 and 0.8 g/g of lipids. The amount of phospholipase is calculated to be in accordance with the ratio described above.

Phospholipases are enzymes that hydrolyze phospholipids. One phospholipase that can be used in the method according to the invention is a type A2 phospholipase, namely PLA2 Nagase 10P/R produced by Nagase ChemteX Corporation, and derived from *Streptomyces violaceoruber* NBRC 15146.

PLA2 activity is measured with soy lecithin as substrate. This is placed at 37° C. and pH 8.0, and the activity is measured using, for example, a Wako NEFA-C Test enzyme kit (Wako Pure Chemical Industries, Ltd.). One unit of enzyme activity corresponds to the hydrolysis of 1 μmol of fatty acid in one minute.

The PLA2 Nagase 10P/R enzyme thus titrates 100,000 U/g.

Cyclodextrins are cyclic oligosaccharides composed of several glucopyranose ($C_6H_{10}O_5$) units linked by an α-(1,4) bond. The most common are α-cyclodextrins, β-cyclodextrins and γ-cyclodextrins consisting of 6, 7 and 8 glucopyranoses respectively. One of the main benefits of cyclodextrins is their ability to form inclusion complexes with various compounds due to their "conical cylinder" structure.

According to the invention, the drying of the composition can be done by any method known per se, preferentially by freeze-drying, drum-drying or spray-drying, in particular by freeze-drying.

An advantage of the method is that it may bypass an ultrasonic treatment step. An ultrasonic treatment step, known per se, is a step of applying ultrasound to material (meal, isolate, etc.) during the process.

According to a last aspect of the invention, the industrial uses, in particular the animal feed and human food uses, of the leguminous plant protein composition, preferentially of the leguminous plant protein isolate, chosen from pea and faba bean, even more preferentially of the pea protein isolate according to the invention, are proposed.

The invention will be better understood by means of the nonlimiting examples hereinbelow.

EXAMPLES

For these examples, yellow peas are used, with a total lipid content equal to 2.3% of the dry matter. Linoleic acid represents 53.3% of the total fatty acids in this meal.

The BCD (Betacyclodextrin) used is Kleptose® from Roquette.

The phospholipase used is Nagase PLA2 10P/R, diluted to a concentration of 1% w/w with demineralized water. The solution also contains 0.5% NaCl and 0.1% CaCl2.

Example 1a

Production of a Leguminous Plant Protein Isolate According to the Invention from Previously Extracted Globulins The globulins are extracted using a conventional extraction method. In this example, yellow pea seeds are used. After dehulling the external fibers using a hammer mill, the pea seeds are milled to produce a meal. This meal is then soaked in water to a final concentration of 16.5% by weight of solids relative to the weight of said suspension, at a pH of 6.5, for 30 minutes at room temperature. The meal suspension at 25% by weight of solids is then introduced into a series of hydrocyclones, which separate a light phase consisting of a mixture of proteins, internal fibers (pulps) and soluble matter and a heavy phase, containing the starch. The light phase at the outlet of the hydrocyclones is then adjusted to a solids content of 11.2% relative to the weight of said suspension. The separation of the internal fibers is performed by treatment in centrifugal decanters of WESTFALIA type. The light phase at the outlet of the centrifugal decanter contains a mixture of proteins and of soluble matter, while the heavy phase contains the pea fibers. The proteins are coagulated at their isoelectric point by adjusting the light phase at the outlet of the centrifugal decanter to a pH of 4.6 and heating this solution at 70° C. for 4 min. After coagulation of the proteins, a protein floc is obtained, composed predominantly of globulins.

The protein floc is resuspended in demineralized water and then introduced into the reactor where the reagents, βCD and PLA2, are added under specific temperature (45° C.) and pH (8.5) conditions. The amounts of βCD and PLA2 are calculated relative to the residual amount of lipid in an assay equal to 0.04 g of βCD per g of lipids and 0.002 g of a 1% solution of phospholipase Nagase PLA2 10P/R per g of lipids, respectively. After 180 min of reaction, the solution is heated to 60° C. for 10 min to inhibit PLA2. Then the treated solution was flocculated 10 min at 60° C. at pH 4.5 before being centrifuged 2 times at 8000 g for 10 min to remove βCD complexes. Finally, the globulins are resuspended in demineralized water and the pH is raised to 7 before freeze-drying.

Example 1b

Production of a Leguminous Plant Protein Isolate from Meal

This example differs from Example 1a in that the point of injection of βCD and phospholipase is upstream, during the pea meal suspension step.

In this example, yellow pea seeds are used. After dehulling the external fibers using a hammer mill, the pea seeds are milled to produce a meal. This meal is then soaked in a reactor with water to a final concentration of 16.5% by weight of solids relative to the weight of said suspension. The reagents, βCD and PLA2, are introduced into the reactor and the resulting solution is placed under specific conditions of temperature (45° C.) and pH (8.5). The amounts of βCD and PLA2 are calculated relative to the residual amount of lipids in an assay equal to 0.04 g of βCD per g of lipid and 0.002 g of a 1% solution of phospholipase Nagase PLA2

10P/R per g of lipids, respectively. After 180 min of reaction, the solution is heated to 60° C. for 10 min to inhibit PLA2. The meal suspension is then introduced into a series of hydrocyclones, which separate a light phase consisting of a mixture of proteins, internal fibers (pulps) and soluble matter and a heavy phase, containing the starch. The light phase at the outlet of the hydrocyclones is then adjusted to a solids content of 11.2% relative to the weight of said suspension. The separation of the internal fibers is performed by treatment in centrifugal decanters of WESTFALIA type. The light phase at the outlet of the centrifugal decanter contains a mixture of proteins and of soluble matter, while the heavy phase contains the pea fibers. The proteins are coagulated at their isoelectric point by adjusting the light phase at the outlet of the centrifugal decanter to a pH of 4.6 and heating this solution at 70° C. for 4 min. After coagulation of the proteins, a protein floc is obtained, composed predominantly of globulins.

Example 1c

Production of a Leguminous Plant Protein Isolate According to the Invention from Previously Extracted Globulins with a βCD/Lipase Ratio Outside the Invention The purpose of this example is to demonstrate the importance of the βCD/lipase ratio In this example, yellow pea seeds are used. After dehulling the external fibers using a hammer mill, the pea seeds are milled to produce a meal. This meal is then soaked in water to a final concentration of 16.5% by weight of solids relative to the weight of said suspension, at a pH of 6.5, for 30 minutes at room temperature. The meal suspension at 25% by weight of solids is then introduced into a series of hydrocyclones, which separate a light phase consisting of a mixture of proteins, internal fibers (pulps) and soluble matter and a heavy phase, containing the starch. The light phase at the outlet of the hydrocyclones is then adjusted to a solids content of 11.2% relative to the weight of said suspension. The separation of the internal fibers is performed by treatment in centrifugal decanters of WESTFALIA type. The light phase at the outlet of the centrifugal decanter contains a mixture of proteins and of soluble matter, while the heavy phase contains the pea fibers. The proteins are coagulated at their isoelectric point by adjusting the light phase at the outlet of the centrifugal decanter to a pH of 4.6 and heating this solution at 70° C. for 4 min. After coagulation of the proteins, a protein floc is obtained, composed predominantly of globulins.

The protein floc is resuspended in demineralized water and then introduced into the reactor where the reagents, βCD and PLA2, are added under specific temperature (45° C.) and pH (8.5) conditions. The amounts of βCD and PLA2 are calculated relative to the residual amount of lipid in an assay equal to 0.71 g of βCD per g of lipids and 0.002 g of a 1% solution of phospholipase Nagase PLA2 10P/R per g of lipids, respectively. After 180 min of reaction, the solution is heated to 60° C. for 10 min to inhibit PLA2. Then the treated solution was flocculated 10 min at 60° C. at pH 4.5 before being centrifuged twice at 8000 g for 10 min to remove βCD complexes. Finally, the globulins are resuspended in demineralized water and the pH is raised to 7 before freeze-drying.

Example 2

Measurement of Total Lipids in Different Isolates According to the Invention

The total lipids are analyzed, as is the content of different fatty acids present. The protocol for analyzing total lipids is as follows:

The protocol for analyzing linoleic acid content is as follows:

Both values are expressed in relation to the protein content in order to compare the different samples. The protein content is obtained by measuring the nitrogen content of the sample, which is multiplied by the coefficient 6.25.

The table below summarizes and compares the different tests:

TABLE 1

| | Total lipids (in g/100 g dry proteins) | Reduction in lipid content (%) | Linoleic acid (in g/100 g dry proteins) | Reduction in linoleic acid content (%) |
|---|---|---|---|---|
| Pea | 12 | — | 3.8 | — |
| Example 1a | 7.3 | 39% | 2.9 | 23.6% |
| Example 1b | 10 | 16% | 3.7 | 2.6% |
| Example 1c | 9.3 | 20% | 3.6 | 5.2% |

These assays show both the importance of the injection site of βCD and phospholipase, as well as the ratio of βCD to lipase. Indeed, only example 1a according to the invention makes it possible to obtain a protein isolate having:
a large reduction of lipid content leading to a rate of less than 9 g of total lipids for 100 g of proteins;
a large reduction in linoleic acid content of more than 20% (23.6%).

The invention claimed is:
1. A method for preparing a leguminous plant protein isolate, the leguminous plant being selected from pea and faba bean wherein it contains between 7 g and 9 g of total lipids per 100 g of proteins, wherein said isolate does not contain organic solvent, comprising the following steps:
   1) suspending the leguminous plant proteins in water to produce a suspension;
   2) adjusting the suspension to a pH of 8.5;
   3) heating the suspension to a temperature between 4° and 50° C.;
   4) adding an aqueous solution to the suspension comprising a mixture of phospholipase and β-cyclodextrin, characterized in that the ratio between phospholipase A2 activity and the amount of β-cyclodextrin, expressed in units of phospholipase A2 activity per g of β-cyclodextrin, is between 10 and 100;
   5) stirring the suspension for 160 to 200 minutes;
   6) adjusting the pH of the suspension to 4.5;
   7) heating the suspension to 50 to 70° C. for 8 to 12 minutes;
   8) centrifugating the suspension to obtain a protein pellet then optionally washing in demineralized water, then centrifugating a second time;
   9) suspending the protein pellet in water, then adjusting pH to 7, to obtain a protein isolate; and
   10) drying the obtained-protein isolate.

2. The method according to claim 1, wherein the amount of β-cyclodextrin used in step 4 is between 0.04 and 0.8 g/g total lipids in the protein isolate.

3. The method according to claim 1, wherein the leguminous plant proteins suspended in step 1 are composed of more than 50% globulins.

4. The method according to claim 1 wherein the method does not comprise an ultrasonic treatment step.

5. The method according to claim 1, wherein the leguminous plant proteins is pea.

6. The method according to claim 1, wherein the temperature of step 3) is 45° C.

7. The method according to claim 1, wherein in step 4), the amount of β-cyclodextrins, expressed in units of phospholipase A2 activity per g of β-cyclodextrins, is between 20 and 80.

8. The method according to claim 7, wherein in step 4), the amount of β-cyclodextrins, expressed in units of phospholipase A2 activity per g of β-cyclodextrins, is between 25 and 50.

9. The method according to claim 1, wherein the step of stirring is carried out for a time of 180 minutes.

10. The method according to claim 1, wherein the step of heating is carried out at a temperature of 60° C.

11. The method according to claim 1, wherein the step of heating is carried out for a time of 10 minutes.

12. The method according to claim 3, wherein the leguminous plant proteins suspended in step 1 are composed of more than 70% globulins.

13. The method according to claim 12, wherein the leguminous plant proteins suspended in step 1 are composed of more than 80% globulins.

* * * * *